Patented Jan. 11, 1944

2,339,059

UNITED STATES PATENT OFFICE 2,339,059

ACID-CURING RESIN COMPOSITION

Gaetano F. D'Alelio, Pittsfield, Mass., assignor to General Electric Company, a corporation of New York No Drawing. Application April 11, 1942, Serial No. 438,589

17 Claims. (Cl. 260—5.9)

This invention relates to the production of new materials and more particularly is concerned with synthetic compositions of particular utility in the plastics and coating arts and which contain, or are produced from, certain halogen compounds hereafter identified.

The halogen compounds used in carrying the present invention into effect may be represented by the following general formula:

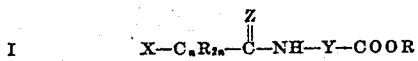

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and substituted hydrocarbon radicals, more particularly halohydrocarbon radicals, and X represents a halogen atom, more particularly a chlorine, bromine, fluorine or iodine atom. Since $n$ represents an integer which is 1 or 2, it will be seen that the halogen atom represented by X in all cases will be alpha or beta to the carbamyl or thiocarbamyl grouping.

Illustrative examples of radicals that R in the above formula may represent are: aliphatic (e. g., methyl, ethyl, propyl, isopropyl, allyl, methallyl, ethallyl, crotyl, butyl, secondary butyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylpropyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. Preferably R in Formula I is hydrogen. However, there also may be used in carrying the present invention into effect chemical compounds such, for instance, as those represented by the formulas:

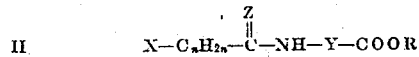

and, more particularly,

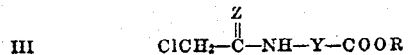

where $n$, Z, Y, R and X have the same meanings as above given with reference to Formula I.

Illustrative examples of divalent carbocyclic radicals that Y in Formulas I, II and III may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, hydroxy, alkoxy, aryloxy, sulfamyl, alkyl, alkenyl, a —COOR group or groups in addition to the single —COOR group shown in the above formulas, etc. Specific examples of substituted divalent carbocyclic radicals are chlorophenylene, bromophenylene, bromonaphthylene, bromo 1,4-tolylene, chlorocyclopentylene, bromocyclopentylene, carbomethoxyphenylene, ethoxyphenylene, acetophenylene, acetoxyphenylene, bromocyclopentenylene, aminophenylene, phenoxyphenylene, hydroxyphenylene, methylphenylene (tolylene), allylphenylene, etc. Preferably Y is phenylene or methylphenylene.

The halogen compounds used in carrying the present invention into effect may be produced in various ways. One suitable method comprises effecting reaction between (1) a carbocyclic amine having a —COOR grouping attached to the carbocyclic substituent and (2) a halogeno aliphatic acyl halide in the presence of a hydrohalide acceptor, e. g., an alkali-metal hydroxide such as sodium hydroxide, potassium hydroxide, etc. The reaction advantageously is carried out in a suitable solvent such as water, alcohol, acetone, etc., depending upon the solubility and reactivity of the individual reactants, and at a relatively low temperature, for example at temperatures of the order of 0–30° C. The reaction may be represented by the following general equation:

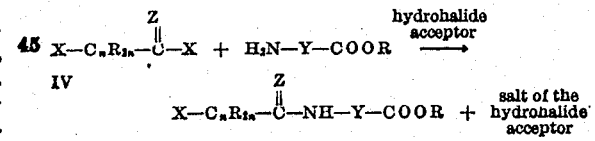

where $n$, Z, Y, R and X have the same meanings as above given with reference to Formula I. As will be readily understood by those skilled in the art, when R in the grouping —COOR represents hydrogen then such grouping will react with the hydrohalide acceptor to yield a salt. However, when the haloacyl halide reacts with the amine, a mineral acid is formed in situ and this then regenerates the carboxylic acid group.

Specific examples of compounds embraced by

Formula I that may be used in carrying the present invention into effect are listed below:

The ortho-, meta- and para-carboxyphenyl-carbamyl chloro methanes
The ortho-, meta- and para-carboxyphenyl-thiocarbamyl chloro methanes
The ortho-, meta- and para-carboxytolyl-carbamyl chloro methanes
The ortho-, meta- and para-carboxytolyl-thiocarbamyl chloro methanes
The ortho-, meta- and para-carboxyphenyl-carbamyl bromo methanes
The ortho-, meta- and para-carboxytolyl-carbamyl bromo methanes
The ortho-, meta- and para-carboxytolyl-thiocarbamyl bromo methanes
The ortho-, meta- and para-carboxyphenyl-carbamyl iodo methanes
The ortho-, meta- and para-carboalkoxy (e. g., carbomethoxy, carboethoxy, carbopropoxy, carbobutoxy, etc.) phenyl-carbamyl chloro methanes
The ortho-, meta- and para-carboaroxy (e. g., carbophenoxy, carbonaphthoxy, etc.) tolyl-carbamyl chloro methanes
Alpha - (para - carboxyphenyl - carbamyl) beta-chloro ethane
Alpha-(meta-carboxyphenyl - thiocarbamyl) alpha-chloro ethane
Alpha-(ortho-carbomethoxytolyl - thiocarbamyl) beta-chloro ethane
Alpha-(para-carboethoxyphenyl - carbamyl) alpha-chloro ethane
Alpha-(ortho-carboxyphenyl - carbamyl) alpha-chloro pentane
Alpha - (para - carbobutoxytolyl - thiocarbamyl) beta-chloro hexane
Alpha-(4-carbopentoxynaphthyl-[1] - carbamyl) beta-chloro butane
Alpha-(para-carbophenoxy chloro phenyl-carbamyl) alphaethyl beta-phenyl beta-bromo ethane
Carboxytolyl-carbamyl cyclopentyl chloro methane
3-carbobutoxycyclopentyl-carbamyl tolyl chloro methane
Alpha - (para - carboethoxyphenyl - carbamyl) beta-fluoro ethane
Alpha - (meta-carbomethoxytolyl-thiocarbamyl) beta-iodo ethane
Alpha-(para-carboethoxyphenyl - carbamyl) alpha-iodo omega-chloro pentane
The ortho-, meta- and para-carboalkoxyphenyl-carbamyl iodo methanes
Alpha-(para-carbobutoxyphenyl-carbamyl) beta-chloro 3-butene The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and a halogenated compound of the kind embraced by Formula I, numerous examples of which have been given above. These new reaction products are not only valuable in themselves, but find particular utility when incorporated into an acid-curing thermosetting resin, for example acid-curing thermosetting phenoplasts and aminoplasts. For instance, I may add a soluble, fusible aldehyde-reaction product of the halogen compound to an acid-curing thermosetting resin and heat the resulting mixture. The aldehydic reaction product accelerates the conversion of the acid-curing thermosetting resin to an insoluble, infusible state. Or, I may cause the halogen compound itself to react with the acid-curing thermosetting resin and thus accelerate the curing of the resin. Or, I may form a rapidly curing resin by effecting reaction between ingredients comprising a halogen compound of the kind embraced by Formula I, an aldehyde, including polymeric aldehydes, hydroxyaldehydes and aldehyde-addition products, and a phenol (including phenol itself, cresols, xylenols, etc.) or an amino or amido compound (including imino and imido compounds), for instance, aminotriazines, e. g., melamine, aminotriazoles, e. g., guanazole, aminodiazines, e. g., 2,4,6-triamino pyrimidine, a urea, e. g., urea itself, thiourea, dicyandiamide, etc.

The resin syrups and molding compositions of this invention may be stored for long periods of time without material alteration. In marked contrast the prior acid-curing thermosetting resins, more particularly those containing direct or active curing catalysts such as mineral acids, e. g., hydrochloric, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions at normal or at elevated temperatures. Any substance or catalyst which has an alkaline or an acid nature may be used to obtain the acid, alkaline or neutral condition, for example ammonia, sodium hydroxide, calcium hydroxide, methyl amine, diethyl amine, tributyl amine, ethanol amines, tri-isopropanol amine, etc.; mixtures of such alkaline substances; inorganic or organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; basic salts such as ammonium carbonate, potassium carbonate, sodium acetate, etc.; or mixtures of such salts.

I may condense the components used in practicing this invention under various conditions. For example, all the components may be mixed together and the reaction caused to proceed under acid, alkaline or neutral conditions. Or, I may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, etc., and an aldehyde), add the hereindescribed halogen compound thereto and effect further condensation. Or, I may first partially condense the halogen compound with a molecular excess of an aldehyde under acid, alkaline or neutral conditions and then add thereto at least one other aldehyde-reactable organic compound, e. g., a phenol, a urea, aniline, etc., and effect further condensation. Also, I may separately partially condense a halogen compound of the kind embraced by Formula I and a different aldehyde-reactable organic compound with an aldehyde and then mix the two products of partial condensation and effect further condensation therebetween. The components of each reaction product may be initially condensed under acid, neutral or alkaline conditions at normal or at elevated temperatures.

Still other ways may be employed in combining the components and in producing the unmodified or modified condensation products of this invention, as readily will be understood by those skilled in the art as the description of the invention proceeds. These condensation reactions may be carried out under a wide variety of time, pressure and temperature conditions. The temperature of reaction may vary, for example, from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

Example 1

| | Parts |
|---|---|
| Urea | 30.0 |
| Aqueous formaldehyde (approx. 37.1% HCHO) | 64.8 |
| Para - carboethoxyphenyl - carbamyl chloro methane | 2.0 |
| Aqueous ammonia (approx. 28% NH₃) | 3.0 |
| Aqueous solution of sodium hydroxide (0.5 N) | 1.7 |

All of the above ingredients with the exception of the para-carboethoxyphenyl-carbamyl chloro methane were heated together under reflux at the boiling temperature of the mass for 20 minutes. One part (that is, one-half of the total amount) of the chloro compound was added to the resulting urea-formaldehyde partial condensation product and refluxing was continued for an additional 20 minutes. The remainder of the chloro compound was now added, followed by refluxing for 10 minutes more. A molding (moldable) composition was prepared from the thick resinous syrup thereby produced by mixing therewith 33.5 parts of alpha cellulose in flock form and 0.2 part of a mold lubricant, specifically zinc stearate. The wet molding compound was dried at room temperature for about 16 hours. A well-cured molded piece having a well-knit and homogeneous structure was obtained by molding a sample of the dried and ground molding composition for 5 minutes at 140° C. under a pressure of 4,500 pounds per square inch. The molding compound showed good plastic flow during molding.

Example 2

| | Parts |
|---|---|
| Melamine | 37.8 |
| Aqueous formaldehyde (approx. 37.1% HCHO) | 72.9 |
| Para - carboethoxyphenyl - carbamyl chloro methane | 0.5 |
| Aqueous ammonia (approx. 28% NH₃) | 1.7 |
| Aqueous solution of sodium hydroxide (0.5N) | 2.0 |

All of the above ingredients with the exception of the para-carboethoxyphenyl-carbamyl chloro methane were heated together under reflux at the boiling temperature of the mass for 20 minutes. The resulting resinous syrup was mixed with 35.0 parts alpha cellulose, 0.2 part zinc stearate and the above-stated amount of para-carboethoxyphenyl-carbamyl chloro methane to form a molding composition. The wet molding compound was dried as described under Example 1. A sample of the dried and ground molding compound was molded into the form of a disk, using a molding temperature of 140° C., a molding time of 5 minutes and a molding pressure of 4,500 pounds per square inch. The disk was extracted hot from the mold and did not warp or become distorted upon cooling to room temperature. It was well cured throughout, had a good surface finish and a homogeneous and well-knit structure. It had excellent resistance to water as shown by the fact that it absorbed only 1.28% by weight of water when immersed in boiling water for 15 minutes, followed by immersion in cold water for 5 minutes. The molding compound had good plastic flow during molding as evidenced by the amount of flash on the molded disk.

Example 3

| | Parts |
|---|---|
| Melamine | 37.8 |
| Thiourea | 22.8 |
| Aqueous formaldehyde (approx. 37.1% HCHO) | 121.5 |
| Para-carboethoxyphenyl - carbamyl chloro methane | 1.5 |
| Aqueous ammonia (approx. 28% NH₃) | 4.0 |
| Aqueous solution of sodium hydroxide (0.5 N) | 3.0 |

All of the above components with the exception of the para-carboethoxyphenyl-carbamyl chloro methane were heated together under reflux for 20 minutes. The para-carboethoxyphenyl-carbamyl chloro methane was now added and refluxing was continued for an additional 5 minutes to cause the said chloro methane to intercondense with the melamine-thiourea-formaldehyde partial condensation product. A molding composition was prepared from the resulting resinous syrup by mixing therewith 63.5 parts alpha cellulose and 0.3 part zinc stearate. This compound was dried and molded as described under Examples 1 and 2. The molded piece was well cured throughout and possessed a well-knit and homogeneous structure. It was more resistant to water than the molded article of Example 2, absorbing only 0.52% by weight of water when tested for its water-resistance characteristics as described under the preceding example. The appearance of the molded article indicated that the plasticity of the molding compound during molding was very good.

Example 4

| | Parts |
|---|---|
| Aminotriazole, specifically 1-tolyl guanazole | 16.3 |
| Aqueous formaldehyde (approx. 37.1% HCHO) | 18.1 |
| Para - carboethoxyphenyl - carbamyl chloro methane | 0.5 |
| Aqueous solution of sodium hydroxide (0.5 N) | 0.8 | were heated together in an open reaction vessel until the reaction mass began to separate into two layers. The resinous syrup thereby produced was mixed with 12 parts alpha cellulose and 0.1 part zinc stearate to form a molding compound. The wet molding compound was dried at room temperature until sufficient moisture had been removed to provide a material that could be molded satisfactorily. A sample of the dried and ground compound was molded for 5 minutes at 140° C. under a pressure of 4,500 pounds per square inch, yielding a well-cured molded piece having a well-knit and homogeneous structure. The molding compound showed good plastic flow during molding.

*Example 5*

| | Parts |
|---|---|
| Para - carboethoxyphenyl - carbamyl chloro methane | 24.2 |
| Aqueous formaldehyde (approx. 37.1% HCHO) | 90.0 | were heated together under reflux at the boiling temperature of the mass for about 30 minutes, yielding a reaction product which did not cure to an insoluble, infusible state when a small sample of it was heated on a 150° C. hot plate. Instead of heating the reactants under reflux, the mixture may be shaken for a longer period, for example 24 to 72 hours or longer, at room temperature (20° to 30° C.) to effect reaction between the components and to obtain a soluble, fusible reaction product.

*Example 6*

A phenol-formaldehyde partial condensation product was prepared by heating together the following components, with constant agitation, for 2½ hours at approximately 85-90° C.:

| | Parts |
|---|---|
| Phenol | 180.0 |
| Aqueous formaldehyde (approx. 37.1% HCHO) | 390.0 |
| Sodium carbonate (anhydrous) | 4.4 |

Due to a slight exothermic reaction the temperature rose for a brief period to 96° C. The resinous syrup produced in this manner is identified in the following formula as "syrupy phenolic resin."

| | Parts |
|---|---|
| Syrupy phenolic resin | 30.0 |
| Para-carboethoxyphenoyl - carbamyl chloro methane | 2.4 |
| Glycerine | 2.0 |

The phenolic resin, which initially was dark red in color, became lighter in color as the para-carboethoxyphenyl-carbamyl chloro methane lowered the pH of the solution.

The reaction mixture was heated slowly under reduced pressure (55 mm. mercury) until an internal resin temperature of 60° C. was reached. The resulting molasses-like liquid resin was poured into a container and heated therein for 48 hours at 70° C. The resin cured to an insoluble and infusible state. The solidified resin was hard, smooth, homogeneous, fairly light in color and opaque. This latter characteristic was due mainly to the fact that the liquid casting resin had been insufficiently dehydrated. The solid resin was clear in its upper portion where the water could escape.

*Example 7*

| | Parts |
|---|---|
| Urea | 30.0 |
| Aqueous formaldehyde (approx. 37.1% HCHO) | 67.0 |
| Aqueous ammonia (approx. 28% NH₃) | 3.5 |
| Aqueous solution of sodium hydroxide (0.5 N) | 1.6 | were heated together under reflux at the boiling temperature of the mass for 20 minutes, yielding a resinous syrup that is identified in the following formula as "urea-formaldehyde syrup":

| | Parts |
|---|---|
| Urea-formaldehyde syrup | 102.0 |
| Reaction product of Example 5 | 9.5 |

These components were heated together under reflux at the boiling temperature of the mass for 10 minutes. The resulting resinous syrup was mixed with 34 parts alpha cellulose and 0.2 part zinc stearate to form a molding composition. The wet molding compound was dried at room temperature until sufficient moisture had been removed to provide a material that could be molded satisfactorily. A sample of the dried and ground molding compound was molded for 5 minutes at 140° C. under a pressure of 9,000 pounds per square inch. The molded piece was well cured throughout and had a homogeneous and well-knit structure. It had good water resistance as shown by the fact that it absorbed only 3.5% by weight of water when tested for its water-resistance characteristics as described under Example 2. (Molded articles made from the ordinary urea-formaldehyde molding compositions and cured with the usual curing agents, when similarly tested, generally show a water-absorption value of the order of 5 to 7%.) The molding compound showed good plastic flow during molding.

*Example 8*

| | Parts |
|---|---|
| Melamine | 32.0 |
| Aqueous formaldehyde (approx. 37.1% HCHO) | 61.0 |
| Aqueous ammonia (approx. 28% NH₃) | 1.5 |
| Aqueous solution of sodium hydroxide (0.5 N) | 1.25 | were heated together under reflux at the boiling temperature of the mass for 15 minutes, yielding a resinous syrup that is identified in the following formula as "melamine-formaldehyde syrup":

| | Parts |
|---|---|
| Melamine-formaldehyde syrup | 96.0 |
| Reaction product of Example 5 | 4.8 |

These components were heated together under reflux at the boiling temperature of the mass for 10 minutes. A molding compound was prepared by mixing 32 parts alpha cellulose and 0.2 part zinc stearate with the resulting resinous syrup. This compound was dried and molded as described under Example 7 with the exception that a molding time of only 3 minutes was employed. A well-cured molded piece having excellent resistance to water was obtained, as evidenced by the fact that it absorbed only 0.24% by weight of water when tested for its water-resistance characteristics as described under Example 2. The flow of the compound during molding was slightly better than the compound of Example 7, as indicated by the amount of flash on the molded piece and its evenness or homogeneity of structure.

*Example 9*

| | Parts |
|---|---|
| Dimethylol urea (commercial grade containing approx. 11% by weight of water) | 60.0 |
| Aqueous ammonia (approx. 28% NH₃) | 3.5 |
| Aqueous solution of sodium hydroxide (0.5 N) | 1.6 |
| Water | 42.0 | were heated together under reflux at the boiling temperature of the mass for 20 minutes, yielding a resinous syrup that is identified in the following formula as "dimethylol urea syrup":

| | Parts |
|---|---|
| Dimethylol urea syrup | 107.0 |
| Reaction product of Example 5 | 9.5 |

These components were heated together at the boiling temperature of the mass for 20 minutes. A molding compound was prepared from the resulting syrup by mixing therewith 36 parts alpha cellulose and 0.2 part zinc stearate. The wet molding compound was dried and molded as described under Example 7 with the exception that a molding pressure of 8,000 pounds per square inch was employed. A well-molded product which was not so resistant to water as the molded pieces of Examples 7 and 8 was obtained. The plasticity of the compound during molding was about the same as that shown by the molding compound of Example 8.

*Example 10*

| | Parts |
|---|---|
| 1-phenyl guanazole | 35.0 |
| Aqueous formaldehyde (approx. 37.1% HCHO) | 32.4 |
| Aqueous ammonia (approx. 28% NH₃) | 1.2 |
| Aqueous solution of sodium hydroxide (0.5 N) | 0.8 |
| Reaction product of Example 5 | 9.5 | were heated together in an open reaction vessel for 5 minutes, at the end of which period of time separation of a resinous mass took place. The reaction mixture was mixed with 23 parts alpha cellulose and 0.1 part zinc stearate to form a molding compound. The wet molding composition was dried and molded as described under Example 7. The molded piece was well cured throughout and had a well-knit and homogeneous structure. Its plasticity during molding was about the same as that of the molding compound of Example 7.

*Example 11*

| | Parts |
|---|---|
| Trimethylol melamine (crystalline) | 43.0 |
| Aqueous ammonia (approx. 28% NH₃) | 1.2 |
| Aqueous solution of sodium hydroxide (0.5 N) | 1.0 |
| Water | 30.4 | were heated together under reflux at the boiling temperature of the mass for 5 minutes, yielding a resinous syrup that is identified in the following formula as "trimethylol melamine syrup":

| | Parts |
|---|---|
| Trimethylol melamine syrup | 76.0 |
| Reaction product of Example 5 | 4.8 |

These ingredients were heated together under reflux at the boiling temperature of the mass for 8 minutes. The resulting resinous syrup was mixed with 25 parts alpha cellulose and 0.1 part zinc stearate to form a molding compound. The wet molding composition was dried at room temperature until sufficient moisture had been removed to provide a material that could be molded satisfactorily. A sample of the dried and ground molding compound was molded for 3 minutes at 135° C. under a pressure of 9,000 pounds per square inch. The molded article was well cured throughout and had a well-knit and homogeneous structure. It had excellent water resistance, as shown by the fact that it absorbed only 0.52% by weight of water when tested for its water-resistance characteristics as described under Example 2. The molding compound showed good plastic flow during molding.

It will be understood, of course, by those skilled in the art that the reaction between the components may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at boiling temperature as mentioned in many of the individual examples, the reaction between the components may be carried out at temperatures ranging, for example, from room temperature up to the boiling temperature of the mass using substantially longer reaction periods.

It also will be understood by those skilled in the art that my invention is not limited to condensation products obtained by reaction of ingredients comprising an aldehyde and the specific halogen compound named in the above illustrative examples. Thus, instead of using para-carboethoxyphenyl-carbamyl chloro methane, I may use, for example, ortho-carboethoxyphenyl-carbamyl chloro methane, meta-carboethoxyphenyl - carbamyl chloro methane, the ortho-, meta- or para-carboxyphenyl-carbamyl chloro methanes, the carboalkoxycarbocyclic-carbamyl halogeno methanes (e. g., the carboalkoxyphenyl-carbamyl chloro methanes, the carboalkoxytolyl-carbamyl fluoro methanes, the carboalkoxyphenyl-carbamyl bromo methanes, the carboalkoxytolyl-carbamyl iodo methanes, etc), the carboaroxyaryl-carbamyl halogeno methanes (e. g., the carboaroxyaryl-carbamyl chloro methanes, the carboaroxyaryl-carbamyl bromo methanes, etc.) or any other halogen compound (or mixture thereof) embraced by Formula I, numerous specific examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea (numerous examples of which are given in my copending application Serial No. 377,524, filed February 5, 1941), mono- and poly-(N-carbinol) derivatives of amides of poly-carboxylic acids, e. g., maleic, itaconic, fumaric, adipic, malonic, succinic, citric, phthalic, etc., mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, of the aminotriazoles, of the aminodiazines, etc. Particularly good results are obtained with active methylene-containing bodies such as a methylol urea, more particularly mono-and dimethylol ureas, and a methylol aminotriazine, e. g., monomethylol melamine and polymethylol melamines (di-, tri-, tetra-, penta- and hexa-methylol melamines). Mixtures of aldehydes and aldehyde - addition products may be employed, e. g., mixtures of formaldehyde and methylol compounds, such, for instance, as dimethylol urea, trimethylol melamine, hexamethylol melamine, etc.

The ratio of the aldehydic reactant to the halogen compound may be varied over a wide range depending upon the particular properties desired in the final product and the particular halogen compound used as a starting reactant. Thus, I may use, for example, from 0.5 to 6 or 7 or more mols of an aldehyde for each mol of the halogen compound. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 12 or 15 or more mols of such alkylol derivatives for each mol of the halogen compound.

When the halogen compound of the kind embraced by Formula I is used primarily as an intercondensable curing reactant for accelerating the conversion of acid-curing thermosetting resins to an insoluble, infusible state, only a relatively small amount of the halogen compound ordinarily is required, for example an amount corresponding to from 0.2 or 0.3% to 5 or 6% by weight of the resin to be cured, calculated on the basis of the dry resin. In some cases it may be desirable to use higher amounts, for instance up to 8 or 9 or more parts by weight of the halogen compound per 100 parts (net dry) of the acid-curing thermosetting resin. When the halogen compound of the kind embraced by Formula I is incorporated into the acid-curing thermosetting resin in the form of a soluble, fusible aldehyde-reaction product thereof, then higher amounts of such reaction product ordinarily are used as compared with the amount employed when using the halogen compound itself. The halogen compound or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the halogen compounds herein described or by their soluble, fusible aldehyde-reaction products, are the acid-curing phenol-aldehyde resins, aminotriazine-aldehyde resins, e. g., melamine-formaldehyde resins, aminotriazole-aldehyde resins, urea-aldehyde resins, urea-aminotriazine-aldehyde resins, aminodiazine-aldehyde resins, protein-aldehyde resins, e. g., casein-formaldehyde resins, aniline-aldehyde resins, resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanyl urea, biguanidine, aminoguanidine, melamine, triureaido melamine, ammeline, ammelide, melem, melam, melon, aminotriazoles, aminodiazines, etc. Suitable mixtures of such compounds also may be used.

Phenol itself and various substituted phenols, for example the cresols, the xylenols, etc., may be condensed with aldehydes, e. g., formaldehyde, furfural, etc., to form acid-curing thermosetting resins of the phenoplast type, and these thermosetting resins then can be cured to the insoluble and infusible state with the aid of the hereindescribed halogen compounds or with the soluble, fusible aldehyde-reaction products thereof.

If desired, the fundamental reaction products of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53-75, page 4, column 1, lines 1-40, which patent is assigned to the same assignee as the present invention.

Thermosetting molding compositions comprising a filler and an acid-curing thermosetting resin carrying a curing agent comprising a halogen compound of the kind herein described, or a soluble, fusible aldehyde-reaction product of such a halogen compound, may be molded into a variety of shapes under heat and pressure, more particularly at temperatures of the order of 100° to 200 C., preferably from approximately 120° to 180° C. The molding compositions show good plastic flow during molding since the curing agent not only functions as such but also generally serves to impart improved plastic flow to the molding composition. Molded articles of manufacture comprising the molded, heat-hardened molding compositions of this invention have a good surface finish, show no evidence of "bleeding" the curing agent, are well cured throughout, and show no loss in any of their other useful properties due to the presence of the hereindescribed halogen compound or aldehyde-reaction product thereof.

What I claim as new and desire to secure by Letters Patent of the United States is:

1. A composition comprising an acid-curing, thermosetting resin carrying a curing agent therefor comprising a compound selected from the class consisting of (1) compounds represented by the general formula

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom; and (2) soluble, fusible aldehyde-reaction products of the compounds of (1).

2. A composition comprising an acid-curing, thermosetting, phenol-aldehyde resin having incorporated therein a compound represented by the general formula

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

3. A composition comprising an acid-curing, thermosetting, amidogen-aldehyde resin having incorporated therein a compound represented by the general formula

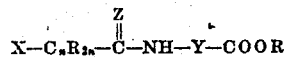

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

4. A composition comprising the product of reaction of ingredients comprising a phenol, an aldehyde and a compound represented by the general formula

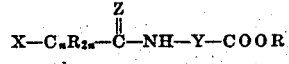

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

5. A composition comprising the product of reaction of ingredients comprising a urea, an aldehyde and a compound represented by the general formula

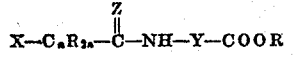

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

6. A composition comprising the product of reaction of ingredients comprising an aminotriazine, an aldehyde and a compound represented by the general formula

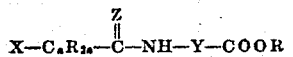

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represent a halogen atom.

7. A heat-curable resinous condensation product of ingredients comprising urea, formaldehyde and a compound represented by the general formula

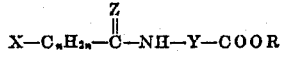

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

8. A product comprising the cured resinous condensation product of claim 7.

9. A composition comprising the resinous product of reaction of ingredients comprising melamine, formaldehyde and a compound represented by the general formula

where $n$ represents an integer and is at least 1 and not more than 2, Z represents a member of the class consisting of oxygen and sulfur, Y represents a divalent carbocyclic radical, R represents a member of the class consisting of hydrogen and monovalent hydrocarbon and halo-hydrocarbon radicals, and X represents a halogen atom.

10. A composition comprising the resinous product of reaction of (1) a partial condensation product of ingredients comprising a phenol and an aldehyde, and (2) a compound represented by the general formula

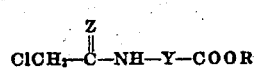

where Z represents a member of the class consisting of oxygen and sulfur, Y represent a divalent carbocyclic radical and R represents a member of the class consisting of hydrogen and monovalent hydrocarbon and halo-hydrocarbon radicals.

11. A composition comprising the resinous product of reaction of (1) a partial condensation product of ingredients comprising a urea and an aldehyde, and (2) a compound represented by the general formula

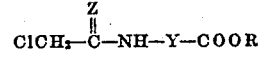

where Z represents a member of the class consisting of oxygen and sulfur, Y represents a divalent carbocyclic radical and R represents a member of the class consisting of hydrogen and monovalent hydrocarbon and halo-hydrocarbon radicals.

12. A resinous composition comprising the product of reaction of (1) a partial condensation product obtained by reaction, while admixed with an alkaline substance, of ingredients comprising urea and formaldehyde, and (2) a carboalkoxy-carbocyclic-carbamyl halogeno methane.

13. A composition comprising the resinous product of reaction of (1) a partial condensation product obtained by reaction, while admixed with an alkaline substance, of ingredients comprising urea and formaldehyde, and (2) a carboalkoxy-aryl-carbamyl chloro methane.

14. A resinous composition comprising the product of reaction of (1) a partial condensation product obtained by reaction, while admixed with an alkaline substance, of ingredients comprising melamine and formaldehyde, and (2) a carboalkoxyaryl-carbamyl chloro methane.

15. A composition comprising the resinous product of reaction of ingredients comprising urea, formaldehyde and para-carboethoxy-phenyl-carbamyl chloro methane.

16. A thermosetting molding composition comprising a filler and an acid-curing partial condensation product of ingredients comprising urea and formaldehyde, said condensation product having incorporated therein a small amount of a curing agent comprising a carboalkoxyphenyl-carbamyl chloro methane.

17. The method which comprises effecting partial reaction between ingredients comprising urea and formaldehyde under alkaline conditions, adding to the resulting condensation product a small amount of a carboalkoxyaryl-carbamyl chloro methane, and causing the said chloro methane to intercondense with the said partial condensation product.

GAETANO F. D'ALELIO.

CERTIFICATE OF CORRECTION.

Patent No. 2,339,059. January 11, 1944.

GAETANO F. D'ALELIO.

It is hereby certified that error appears in the printed specification of the above numbered patent requiring correction as follows: Page 1, first column, line 34, after "diphenyl" strike out the comma; page 2, first column, line 41, for "alphaethyl" read --alpha-ethyl--; page 3, second column, line 66, after "(0.5 N" insert a closing parenthesis; page 4, first column, line 44, for "Para-carboethoxyphenoyl-carbamyl" read --Para-carboethoxyphenyl-carbamyl--; page 6, second column, line 41, for "200 C." read --200° C.--; page 7, first column, line 45, after "urea" insert a comma; line 72, and second column, line 41, for "represent" read --represents--; and that the said Letters Patent should be read with this correction therein that the same may conform to the record of the case in the Patent Office.

Signed and sealed this 11th day of April, A. D. 1944.

Leslie Frazer

(Seal) Acting Commissioner of Patents.